US010164940B2

(12) United States Patent
Smith et al.

(10) Patent No.: US 10,164,940 B2
(45) Date of Patent: **\*Dec. 25, 2018**

(54) METHODS AND APPARATUS FOR PROVIDING HIGH SPEED CONNECTIVITY TO A HOTEL ENVIRONMENT

(71) Applicant: Guest Tek Interactive Entertainment Ltd., Calgary (CA)

(72) Inventors: Wallace Eric Smith, Alpine, UT (US); William B. West, Salt Lake City, UT (US); Steven R. McDaniel, Salt Lake City, UT (US)

(73) Assignee: Guest Tek Interactive Entertainment Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/618,231

(22) Filed: Jun. 9, 2017

(65) Prior Publication Data

US 2017/0339104 A1 Nov. 23, 2017

Related U.S. Application Data

(60) Continuation of application No. 15/337,817, filed on Oct. 28, 2016, now Pat. No. 9,705,846, which is a
(Continued)

(51) Int. Cl.
*H04L 29/12* (2006.01)
*H04L 12/28* (2006.01)
(Continued)

(52) U.S. Cl.
CPC ...... *H04L 61/2514* (2013.01); *H04L 12/2801* (2013.01); *H04L 12/2854* (2013.01);
(Continued)

(58) Field of Classification Search
CPC .................................................. H04L 61/2514
See application file for complete search history.

(56) References Cited

U.S. PATENT DOCUMENTS

| | | |
|---|---|---|
| 3,352,490 A | 11/1967 | Dalzell et al. |
| 3,636,315 A | 1/1972 | Comeau |
| (Continued) | | |

FOREIGN PATENT DOCUMENTS

| | | |
|---|---|---|
| EP | 1017208 A2 | 7/2000 |
| WO | 98/40990 A1 | 9/1998 |
| WO | 9858486 A1 | 12/1998 |

OTHER PUBLICATIONS

International Search Report, ISA/US, dated Jun. 13, 2000, Int'l Appl. No. PCT/US00/04293. (1 page).
(Continued)

*Primary Examiner* — Raj Jain
*Assistant Examiner* — Andrew C Lee
(74) *Attorney, Agent, or Firm* — ATMAC Patent Services Ltd.; Andrew T. MacMillan

(57) ABSTRACT

One or more processors are configured to associate a first local IP address with a computer while the computer is connected to a first network access node thereby providing the computer with access to a network. The first local IP address is one of a plurality of local IP addresses used on the network. The one or more processors monitor transmissions received from the first network access node to determine when the computer requests an Internet transaction. When the computer requests an Internet transaction, a first one of the globally unique IP addresses is associated with the first local IP address thereby allowing the computer to conduct the Internet transaction. The first globally unique IP address is disassociated from the first local IP address after termination of the Internet transaction and is then available for
(Continued)

US 10,164,940 B2
Page 2 association with any of the local IP addresses used on the network.

20 Claims, 12 Drawing Sheets

Related U.S. Application Data continuation of application No. 14/702,264, filed on May 1, 2015, now Pat. No. 9,503,419, which is a continuation of application No. 14/299,147, filed on Jun. 9, 2014, now Pat. No. 9,025,599, which is a continuation of application No. 12/257,208, filed on Oct. 23, 2008, now Pat. No. 8,854,195, which is a continuation of application No. 11/281,254, filed on Nov. 16, 2005, now Pat. No. 7,580,376, which is a continuation of application No. 10/746,275, filed on Dec. 23, 2003, now Pat. No. 6,996,073, which is a division of application No. 09/256,719, filed on Feb. 24, 1999, now Pat. No. 6,738,382.

(51) Int. Cl.
  *H04L 12/46* (2006.01)
  *H04L 29/06* (2006.01)
  *H04L 29/08* (2006.01)
  *H04L 12/751* (2013.01)
  *H04L 12/707* (2013.01)
  *H04L 12/741* (2013.01)
  *H04L 12/721* (2013.01)

(52) U.S. Cl.
  CPC ...... *H04L 12/2859* (2013.01); *H04L 12/4645* (2013.01); *H04L 29/12311* (2013.01); *H04L 61/2015* (2013.01); *H04L 61/2061* (2013.01); *H04L 61/2084* (2013.01); *H04L 61/2503* (2013.01); *H04L 63/104* (2013.01); *H04L 67/10* (2013.01); *H04L 67/141* (2013.01); *H04L 45/02* (2013.01); *H04L 45/22* (2013.01); *H04L 45/54* (2013.01); *H04L 45/72* (2013.01); *H04L 61/6068* (2013.01)

(56) References Cited

U.S. PATENT DOCUMENTS

| | | | |
|---|---|---|---|
| 3,696,378 A | 10/1972 | Daniel | |
| 4,008,369 A | 2/1977 | Theurer et al. | |
| 4,194,181 A | 3/1980 | Brundage | |
| 4,267,406 A | 5/1981 | Perry | |
| 4,284,126 A | 8/1981 | Dawson | |
| 4,439,784 A | 3/1984 | Furukawa et al. | |
| 4,486,773 A | 12/1984 | Okubo | |
| 4,520,905 A | 6/1985 | Sasao | |
| 4,997,029 A | 3/1991 | Otsuka et al. | |
| 5,339,250 A | 8/1994 | Durbin | |
| 5,544,036 A | 8/1996 | Brown, Jr. et al. | |
| 5,614,703 A | 3/1997 | Martin et al. | |
| 5,651,058 A | 7/1997 | Hackett-Jones et al. | |
| 5,669,005 A | 9/1997 | Curbow et al. | |
| 5,708,654 A * | 1/1998 | Arndt | H04L 29/12009 370/242 |
| 5,737,328 A | 4/1998 | Norman et al. | |
| 5,758,522 A | 6/1998 | York | |
| 5,778,370 A | 7/1998 | Emerson | |
| 5,781,734 A | 7/1998 | Ohno et al. | |
| 5,790,548 A * | 8/1998 | Sistanizadeh | H04L 12/2856 370/401 |
| 5,793,763 A | 8/1998 | Mayes et al. | |
| 5,806,260 A | 9/1998 | Quaintance | |
| 5,812,819 A | 9/1998 | Rodwin et al. | |
| 5,819,845 A | 10/1998 | Ryu et al. | |
| 5,835,725 A | 11/1998 | Chiang et al. | |
| 5,851,149 A * | 12/1998 | Xidos | G07F 17/32 463/42 |
| 5,923,306 A | 7/1999 | Smith et al. | |
| 5,936,542 A | 8/1999 | Kleinrock et al. | |
| 5,979,754 A | 11/1999 | Martin et al. | |
| 6,011,782 A | 1/2000 | DeSimone et al. | |
| 6,019,203 A * | 2/2000 | Patel | F16H 61/0251 192/3.3 |
| 6,023,724 A | 2/2000 | Bhatia et al. | |
| 6,029,203 A | 2/2000 | Bhatia et al. | |
| 6,052,725 A | 4/2000 | McCann et al. | |
| 6,058,431 A * | 5/2000 | Srisuresh | H04L 29/12009 709/225 |
| 6,061,349 A | 5/2000 | Coile et al. | |
| 6,069,890 A * | 5/2000 | White | H04M 3/4228 370/352 |
| 6,079,020 A * | 6/2000 | Liu | H04L 41/22 709/223 |
| 6,081,907 A | 6/2000 | Witty et al. | |
| 6,091,951 A | 7/2000 | Sturniolo et al. | |
| 6,118,768 A | 9/2000 | Bhatia et al. | |
| 6,128,298 A * | 10/2000 | Wootton | H04L 12/4604 370/390 |
| 6,128,657 A | 10/2000 | Okanoya et al. | |
| 6,128,664 A * | 10/2000 | Yanagidate | H04L 29/12367 370/389 |
| 6,130,892 A | 10/2000 | Short et al. | |
| 6,141,924 A | 11/2000 | Quaintance | |
| 6,154,461 A | 11/2000 | Sturniolo et al. | |
| 6,154,839 A * | 11/2000 | Arrow | H04L 12/4641 709/245 |
| 6,178,455 B1 | 1/2001 | Schutte et al. | |
| 6,194,992 B1 | 2/2001 | Short et al. | |
| 6,201,962 B1 | 3/2001 | Sturniolo et al. | |
| 6,226,751 B1 * | 5/2001 | Arrow | H04L 12/4641 370/351 |
| 6,269,081 B1 | 7/2001 | Chow et al. | |
| 6,272,150 B1 | 8/2001 | Hrastar et al. | |
| 6,272,159 B1 * | 8/2001 | Garcia | B23K 20/023 372/36 |
| 6,286,039 B1 * | 9/2001 | Van Horne | G06F 8/60 709/219 |
| 6,331,984 B1 * | 12/2001 | Luciani | H04L 29/12009 370/401 |
| 6,353,614 B1 * | 3/2002 | Borella | H04L 29/12009 370/389 |
| 6,377,990 B1 | 4/2002 | Slemmer et al. | |
| 6,381,638 B1 * | 4/2002 | Mahler | H04L 29/12009 370/355 |
| 6,393,017 B1 | 5/2002 | Galvin et al. | |
| 6,437,692 B1 | 8/2002 | Petite et al. | |
| 6,456,625 B1 * | 9/2002 | Itoi | H04L 29/12009 370/401 |
| 6,457,061 B1 * | 9/2002 | Bal | H04L 29/12009 709/245 |
| 6,501,767 B1 * | 12/2002 | Inoue | H04L 29/12009 370/401 |
| 6,523,696 B1 | 2/2003 | Saito | |
| 6,553,418 B1 * | 4/2003 | Collins | H04L 29/06 307/31 |
| 6,577,642 B1 * | 6/2003 | Fijolek | H04L 12/2801 370/465 |
| 6,584,096 B1 * | 6/2003 | Allan | H04L 12/66 370/352 |
| 6,614,774 B1 | 9/2003 | Wang | |
| 6,636,894 B1 | 10/2003 | Short et al. | |
| 6,657,991 B1 * | 12/2003 | Akgun | H04L 12/2801 348/E7.069 |
| 6,697,354 B1 * | 2/2004 | Borella | H04L 29/12009 370/352 |
| 6,738,382 B1 * | 5/2004 | West | H04L 12/2859 370/401 |
| 6,760,384 B1 | 7/2004 | Garreau et al. | |
| 6,789,110 B1 | 9/2004 | Short et al. | |
| 6,795,852 B1 | 9/2004 | Kleinrock et al. | |
| 6,810,426 B2 | 10/2004 | Mysore et al. | |

(56) References Cited

U.S. PATENT DOCUMENTS

| | | | |
|---|---|---|---|
| 6,822,955 B1 * | 11/2004 | Brothers | H04L 29/12018 370/389 |
| 6,850,497 B1 | 2/2005 | Sigler et al. | |
| 6,857,009 B1 | 2/2005 | Ferreria et al. | |
| 6,868,399 B1 | 3/2005 | Short et al. | |
| 6,923,724 B2 * | 8/2005 | Williams | G07F 17/32 463/40 |
| 6,934,754 B2 | 8/2005 | West et al. | |
| 6,940,821 B1 | 9/2005 | Wei et al. | |
| 6,996,073 B2 * | 2/2006 | West | H04L 12/2859 370/260 |
| 7,020,082 B2 | 3/2006 | Bhagavath et al. | |
| 7,043,532 B1 | 5/2006 | Humpleman et al. | |
| 7,088,727 B1 | 8/2006 | Short et al. | |
| 7,117,526 B1 | 10/2006 | Short | |
| 7,194,554 B1 | 3/2007 | Short et al. | |
| 7,197,556 B1 | 3/2007 | Short et al. | |
| 7,216,152 B2 | 5/2007 | Short et al. | |
| 7,280,557 B1 * | 10/2007 | Biswas | H04L 29/12367 370/465 |
| 7,502,851 B1 | 3/2009 | Chu et al. | |
| 7,554,995 B2 | 6/2009 | Short et al. | |
| 7,558,863 B1 | 7/2009 | Sitaraman et al. | |
| 7,580,376 B2 * | 8/2009 | West | H04L 12/2859 370/260 |
| 7,653,033 B2 | 1/2010 | Beach et al. | |
| 7,689,716 B2 | 3/2010 | Short et al. | |
| 7,698,432 B2 | 4/2010 | Short et al. | |
| 7,739,383 B1 | 6/2010 | Short et al. | |
| 7,752,334 B2 | 7/2010 | Paunikar et al. | |
| 7,822,873 B1 | 10/2010 | Paunikar et al. | |
| 7,953,857 B2 | 5/2011 | Short et al. | |
| 8,001,269 B1 * | 8/2011 | Satapati | H04L 29/12028 709/245 |
| 8,027,339 B2 | 9/2011 | Short et al. | |
| 8,051,206 B2 | 11/2011 | Paunikar et al. | |
| 8,102,856 B2 * | 1/2012 | Yang | H04L 29/06027 370/229 |
| 8,156,246 B2 | 4/2012 | Short et al. | |
| 8,190,708 B1 | 5/2012 | Short et al. | |
| 8,234,409 B2 | 7/2012 | Paunikar et al. | |
| 8,244,886 B2 | 8/2012 | Short et al. | |
| 8,266,266 B2 | 9/2012 | Short et al. | |
| 8,266,269 B2 | 9/2012 | Short et al. | |
| 8,291,116 B2 * | 10/2012 | Read | H04L 29/06027 709/245 |
| 8,364,806 B2 | 1/2013 | Short et al. | |
| 8,370,477 B2 | 2/2013 | Short et al. | |
| 8,370,524 B2 | 2/2013 | Paunikar et al. | |
| 8,516,083 B2 | 8/2013 | Short et al. | |
| 8,566,912 B2 | 10/2013 | Olshansky et al. | |
| 8,594,107 B2 | 11/2013 | Short et al. | |
| 8,605,728 B2 * | 12/2013 | Yang | H04L 29/06027 370/229 |
| 8,606,917 B2 | 12/2013 | Short et al. | |
| 8,613,053 B2 | 12/2013 | Pagan et al. | |
| 8,626,922 B2 | 1/2014 | Short et al. | |
| 8,713,641 B1 | 4/2014 | Pagan et al. | |
| 8,725,888 B2 | 5/2014 | Short et al. | |
| 8,725,899 B2 | 5/2014 | Short et al. | |
| 8,854,195 B2 * | 10/2014 | West | H04L 12/2859 340/286.01 |
| 9,025,599 B2 * | 5/2015 | Smith | H04L 12/2859 370/389 |
| 9,503,419 B2 * | 11/2016 | Smith | H04L 12/2859 |
| 9,705,846 B2 * | 7/2017 | Smith | H04L 12/2859 |
| 2005/0243867 A1 | 11/2005 | Petite | |
| 2005/0273508 A1 | 12/2005 | Humpleman et al. | |
| 2009/0052459 A1 | 2/2009 | West et al. | |

OTHER PUBLICATIONS

K. Egevang, et al., "The IP Network Address Translator (NAT)," May 1994, RFC 1631 (10 pages).

International Preliminary Examination Report, ISA/US, dated Aug. 31, 2001, Int'l Appl. No. PCT/US00/04293. (3 pages).

Ibahn General Holdings Corporation and Ibahn Corporation's Opposition to Nomadix, Inc.'s Motion for Summary Judgment of Noninfringement of U.S. Pat. No. 6,934,754, filed Aug. 26, 2013 (36 pages).

Nomadix, Inc.'s Memorandum of Points and Authorities in Support of its Motion for Summary Judgment of Noninfringement of U.S. Pat. No. 6,934,754, filed Apr. 5, 2012 (28 pages).

Portion of prosecution history of U.S. Appl. No. 09/823,088, now U.S. Pat. No. 6,934,754; including non-final Office action dated Nov. 12, 2004, Applicant response dated Nov. 22, 2004, terminal disclaimer decision of Mar. 10, 2005, and Notice of Allowance dated Apr. 12, 2005 (30 pages total).

* cited by examiner

METHODS AND APPARATUS FOR PROVIDING HIGH SPEED CONNECTIVITY TO A HOTEL ENVIRONMENT

RELATED APPLICATION DATA

This application is a continuation of U.S. patent application Ser. No. 15/337,817 filed Oct. 28, 2016 (later issued as U.S. Pat. No. 9,705,846), which is a continuation of U.S. patent application Ser. No. 14/702,264 filed May 1, 2015 (later issued as U.S. Pat. No. 9,503,419), which is a continuation of U.S. patent application Ser. No. 14/299,147 filed Jun. 9, 2014 (later issued as U.S. Pat. No. 9,025,599), which is a continuation of U.S. patent application Ser. No. 12/257,208 filed Oct. 23, 2008 (later issued as U.S. Pat. No. 8,854,195), which is a divisional of U.S. patent application Ser. No. 11/281,254 filed Nov. 16, 2005 (later issued as U.S. Pat. No. 7,580,376), which is a continuation of U.S. patent application Ser. No. 10/746,275 filed Dec. 23, 2003 (later issued as U.S. Pat. No. 6,996,073), which is a divisional of U.S. patent application Ser. No. 09/256,719 filed Feb. 24, 1999 (later issued as U.S. Pat. No. 6,738,382); all of these applications are incorporated herein by reference for all purposes.

BACKGROUND OF THE INVENTION

(1) Field of the Invention

The present invention relates to network communications and, more specifically, to providing high speed Internet access to users in hotel environments.

(2) Description of the Related Art

Any business traveler who relies on network communications to maintain contact with clients and the home office appreciates the availability of fast and reliable data ports at remote locations such as airport lounges and hotel rooms. The hospitality industry has only recently begun to understand the necessity of providing such high speed data connections to business travelers. In fact, given the explosive growth of network technologies and the corresponding dependence of the business professional on such technologies, hotels which do not move to provide high speed connectivity in guest rooms comparable to the typical office environment will likely lose a substantial portion of their business to hotels which do.

Unfortunately, many hotel rooms are not currently wired to accommodate high speed data traffic. That is, prior to 1990, virtually all hotel rooms were wired to provide only basic telephone service. As late as 1995, less than 10% of hotel rooms were wired to handle standard Ethernet data speeds. Even today, while the major players in the hospitality industry are searching for high speed connectivity solutions, the vast majority of hotel guest and conference rooms are still wired with low quality, single pair connections. One obvious solution would be to completely rewire all of the guest and conference rooms in each hotel facility to provide the desired data transmission capabilities. However, given the prohibitive cost of such an undertaking, a less costly solution would be desirable.

Even if such a costly rewiring were undertaken, there are other problems which are not addressed by an infrastructure upgrade. For example, even if a high speed connection to the hotel's host is provided, it will often be the case that a guest's laptop computer would be incompatible with the hotel network in some way. Thus, each guest's laptop must be configured appropriately in order to communicate with the network and with the Internet beyond. This would likely involve loading special software onto a guest's laptop each time the guest wants to go online. Not only would such a process be cumbersome and annoying to the hotel guest, it may also be unacceptable from the guest's point of view in that reconfiguring the laptop may interfere with the current configuration in undesirable ways.

Neither does a costly wiring upgrade address the administrative and security issues related to providing Internet access via a hotel host. That is, high speed Internet access for hotel guests requires a network at the hotel property and some sort of connection between the hotel network and the Internet, e.g., a T1 or T3 line. A firewall at each hotel property would also be required to protect the internal network from unauthorized access. The existence of the firewall at each property, in turn, requires that most of the control and administration of the local network be performed at the hotel property rather than remotely, thus representing an undesirable redundancy of administrative functions.

Another administrative difficulty related to maintaining each hotel property as a separate Internet host involves the management of IP addresses. Ranges of globally unique 32-bit IP addresses are issued to organizations by a central Internet authority. These addresses are organized in a four octet format. Class A IP addresses are issued to very large organizations and employ the first of the four octets to identify the organization's network and the other three to identify individual hosts on that network. Thus, a class A address pool contains nearly 17 million ($2^{24}$) globally unique IP addresses. With class B addresses, the first two octets are used to identify the network and the last two to identify the individual hosts resulting in 64,000 ($2^{16}$) globally unique IP addresses for each organization. Finally, with class C addresses, the first three octets are used to identify the network and the last octet to identify the individual hosts resulting in only 256 ($2^8$) globally unique IP addresses for each organization.

Unfortunately for many medium to large size organizations (1,000 to 10,000 hosts), it has become very difficult, if not impossible, to obtain anything other than a class C address for their networks due to the fact that the class A and B address spaces have been almost entirely locked up. This problem has been addressed to some extent by the use of a Network Address Translation (NAT) protocol. According to such a protocol, when a local host on an organization's network requests access to the Internet, it is assigned a temporary IP address from the pool of globally unique IP addresses available to the organization. The local host is identified by the globally unique address only when sending or receiving packets on the Internet. As soon as the local host disconnects from the Internet, the address is returned to the pool for use by any of the other hosts on the network. For additional details on the implementation of such a protocol please refer to K. Evegang and P. Francis, The IP Network Address Translator (NAT), Request for Comments "RFC" 1631, Cray Communications, NTT, May 1994, the entirety of which is incorporated herein by reference for all purposes.

Such dynamic assignment of IP addresses might be sufficient for certain organizations as long as the number of simultaneous users which require access to the Internet remains below the maximum of 256. However, if, for example, a 1200 room hotel were hosting an Internet technologies seminar it would be extremely likely that the demand for Internet access would exceed the available address pool. All of this also assumes that a major hotel chain would be able to obtain a complete class C pool of addresses for each of its properties; not necessarily a reasonable assumption.

It is therefore desirable to provide methods and apparatus by which each of the properties in a major hotel chain may provide high speed Internet access to each of its guest rooms in a secure, inexpensive, and reliable manner without undue administrative burdens on the individual properties.

BRIEF SUMMARY OF THE INVENTION

According to the present invention, methods and apparatus are provided which make use of existing hotel wiring infrastructures to provide secure, high speed data and Internet access to each of the guest rooms in a hotel property. Specific implementations of the technology described herein have the ability to auto-baud down to whatever speed the wiring infrastructure will allow thus providing the maximum bandwidth allowable by that infrastructure. According to specific embodiments, the present invention is able to select the maximum baud rate appropriate for each individual guest room. According to other specific embodiments, where the wiring to the guest rooms is a single pair phone line, the present invention allows 1 Megabit half duplex data transmissions to coexist on the single pair with standard telephone signals.

According to one embodiment of the invention, each guest room in the hotel is interconnected via the hotel's current wiring infrastructure into a local network. When a guest wishes to access the Internet, he connects his laptop to an in-room module installed in each guest room which temporarily assigns a "fake" local IP address to the guest's laptop. The "fake" local IP address is associated with the in-room module and is unique on the hotel's local network. The address is "fake" in that it is not a valid Internet address and in that it replaces the laptop's own real IP address. The assigned local IP address uniquely identifies the guest's laptop on the hotel network while that laptop remains connected to the in-room module.

A headend module in the hotel handles packet routing and provides access to the Internet. In facilitating access to the Internet, the headend module temporarily assigns globally unique IP addresses from a pool of, for example, class C addresses to in-room modules in individual guest rooms in response to requests for Internet access from those rooms. An assigned IP address remains dedicated to a particular in-room module (and thus the associated guest's computer) for the duration of the Internet transaction. Upon termination of the transaction, the globally unique IP address is disassociated from the in-room module and put back into the pool for use in facilitating a later Internet transaction from any of the hotel's rooms.

According to another embodiment of the invention, the local networks of a number of hotels are interconnected via a remote server thereby forming a private wide area network, or a virtual private network. The operation of the virtual private network to provide high speed data and Internet access to individual guest rooms is similar to the process described above except that the "fake" IP address of the in-room modules are unique over the entire virtual private network, and the temporary assignment of globally unique IP addresses is performed by the remote server rather than the hotel headend. This is advantageous in that it is contemplated that the remote server has a larger pool of such addresses associated therewith than an individual hotel network might be able to procure (e.g., a class B address pool).

Thus, because the IP address needs of all of the hotels in the virtual private network are spread out over the entire installed base of the remote server, bursts of need at any one property which exceed the capacity of a single class C address pool may be accommodated. The virtual private network embodiment of the present invention also has the advantage that firewall security and other network administrative functions may be centralized and performed remotely without compromising the security of any individual hotel network.

Thus, according to the present invention, methods and apparatus are provided for providing access to a network via a first one of a plurality of network access nodes in the network. The network access nodes each have a network address associated therewith which is unique on the network, the first network access node having a first network address associated therewith. The first network address is associated with a first computer while the first computer is connected to the first network access node thereby providing access to the network.

According to a more specific embodiment, Internet access is provided to a first computer via a first one of a plurality of network access nodes in a network using a plurality of globally unique IP addresses. The network access nodes each have a network address associated therewith which is unique on the network, the first network access node having a first network address associated therewith. The first network address is associated with the first computer while the first computer is connected to the first network access node thereby providing access to the network. A first one of the globally unique IP addresses is associated with the first network address for conducting an Internet transaction. The first globally unique IP address is disassociated from the first network address upon termination of the Internet transaction. The first globally unique IP address is then available for association with any of the network addresses. According to one embodiment, the network comprises a local area network and the associating and disassociating of the globally unique IP address is done by a headend associated with the local area network. According to another embodiment, the network comprises a wide area network and the associating and disassociating of the globally unique IP address is done by a remote server which controls the wide area network.

According to a specific embodiment, a network is provided having a plurality of network access nodes each having a network address associated therewith which is unique on the network. Each network access node is for providing access to the network for a computer connected to the network access node. A headend module interconnects the network access nodes. The network address associated with each network access node is associated with the computer connected thereto thereby providing access to the network.

According to another specific embodiment, a wide area network is provided having a plurality of networks each comprising a plurality of network access nodes. Each network access node has a network address associated therewith which is unique among the plurality of networks. Each network access node provides access to the wide area network for a computer connected to the network access node. A remote server interconnects the plurality of networks into the wide area network. The network address associated with each network access node is associated with the computer connected thereto thereby providing access to the wide area network.

According to yet another specific embodiment, a network access node is provided for providing access to a network of which the network access node is a part. The network access node has a network address associated therewith which is unique on the network. According to a more specific embodiment, the network address node is operable to associate the network address with a computer while the computer is connected to the network access node thereby providing access to the network.

According to a further specific embodiment, a headend module is provided for interconnecting a plurality of network access nodes in a network. Each network access node has a network address associated therewith which is unique on the network and provides access to the network for a computer connected to the network access node. According to a more specific embodiment, the headend module associates the network address associated with each network access node with the computer connected thereto thereby providing access to the network.

According to another specific embodiment, methods and apparatus are provided for providing conference services over a network having a plurality of users associated therewith. A group identification tag is associated with selected ones of the plurality of users thereby identifying the selected users as attendees of the conference. The conference services are provided on the network. Access to the conference services is then restricted to the selected users using the group identification tag.

According to another specific embodiment, a method for providing Internet access to a computer via a first one of a plurality of network access nodes in a network using one or more globally unique IP addresses is disclosed. The method includes associating a first local IP address with the computer while the computer is connected to the first network access node thereby providing the computer with access to the network, wherein the first local IP address is one of a plurality of local IP addresses used on the network. The method further includes monitoring transmissions received from the first network access node to determine when the first computer requests an Internet transaction. The method further includes associating a first one of the globally unique IP addresses with the first local IP address thereby allowing the computer to conduct the Internet transaction, and disassociating the first globally unique IP address from the first local IP address after termination of the Internet transaction, the first globally unique IP address then being available for association with any of the local IP addresses used on the network.

According to another specific embodiment there is disclosed an apparatus for providing Internet access to a computer via a first one of a plurality of network access nodes in a network using one or more globally unique IP addresses. The apparatus includes a first communication interface coupled to the network, a second communication interface coupled to the Internet, one or more processors coupled to the first and second communication interfaces, and a memory device storing program instructions. When the program instructions are executed by the one or more processors, the instructions cause the one or more processors to associate a first local IP address with the computer while the computer is connected to the first network access node thereby providing the computer with access to the network, wherein the first local IP address is one of a plurality of local IP addresses used on the network, and monitor transmissions received from the first network access node to determine when the computer requests an Internet transaction. The instructions further cause the one or more processors to associate a first one of the globally unique IP addresses with the first local IP address thereby allowing the computer to conduct the Internet transaction; and disassociate the first globally unique IP address from the first local IP address after termination of the Internet transaction, the first globally unique IP address then being available for association with any of the local IP addresses used on the network.

According to another specific embodiment there is disclosed a method of providing Internet access to a computer via a first one of a plurality of network access nodes in a local area network. The local area network has a pool of one or more globally unique IP addresses. The method includes associating a locally unique IP address of the local area network with the computer for as long as the computer is connected to the first network access node, translating from an internal IP address of the computer to the locally unique IP address to thereby provide the computer with access to the local area network, and monitoring network transmissions received from the first network access node in order to determine that the computer is requesting an Internet transaction. The method further includes temporarily associating a globally unique IP address selected from the pool of globally unique IP addresses with the locally unique IP address in response to the computer requesting the Internet transaction, and translating from the locally unique IP address to the globally unique IP address during the Internet transaction to thereby provide the computer with access the Internet.

According to another specific embodiment there is disclosed an apparatus providing Internet access to a computer via a first one of a plurality of network access nodes in a local area network. The local area network having a pool of one or more globally unique IP addresses. The apparatus includes a first communication interface coupled to the local area network, a second communication interface coupled to the Internet, a central processing unit comprising one or more processors coupled to the first and second communication interfaces, and a memory device storing program instructions. When the program instructions are executed by the one or more processors, the instructions cause the one or more processors to associate a locally unique IP address of the local area network with the computer for as long as the computer is connected to the first network access node, and translate from an internal IP address of the computer to the locally unique IP address to thereby provide the computer with access to the local area network. The instructions further cause the one or more processors to monitor network transmissions received from the first network access node in order to determine that the computer is requesting an Internet transaction, temporarily associate a globally unique IP address selected from the pool of globally unique IP addresses with the locally unique IP address in response to the computer requesting the Internet transaction, and translate from the locally unique IP address to the globally unique IP address during the Internet transaction to thereby provide the computer with access the Internet.

According to another specific embodiment there is disclosed a method for providing Internet access to a computer. The method includes associating a local IP address with the computer while the computer is connected to a network thereby providing the computer with access to the network. The local IP address is selected from a plurality of local IP addresses used on the network. The method further includes monitoring transmissions received from the computer to determine when the computer requests an Internet transaction, and, when determining that the computer has requested the Internet transaction, associating a globally unique IP address with the local IP address thereby allowing the computer to conduct the Internet transaction. The globally unique IP address is selected from a pool of one or more globally unique IP addresses. The method further includes disassociating the globally unique IP address from the local IP address after termination of the Internet transaction. The globally unique IP address then returning to the pool such that it is available for association with another of the local IP addresses used on the network.

According to another specific embodiment there is disclosed an apparatus for providing Internet access to a computer. The apparatus includes a first communication interface coupled to a network, a second communication interface coupled to the Internet, one or more processors coupled to the first and second communication interfaces, and a memory device storing a plurality of program instructions. When the program instructions are executed by the one or more processors the program instructions cause the one or more processors to associate a local IP address with the computer while the computer is connected to the network thereby providing the computer with access to the network. The local IP address is selected from a plurality of local IP addresses used on the network. The one or more processors further monitor transmissions received from the computer to determine when the computer requests an Internet transaction, and associate a globally unique IP address with the local IP address when determining that the computer has requested the Internet transaction thereby allowing the computer to conduct the Internet transaction. The globally unique IP address is selected from a pool of one or more globally unique IP addresses. The one or more processors further disassociate the globally unique IP address from the local IP address after termination of the Internet transaction, the globally unique IP address then returning to the pool such that it is available for association with another of the local IP addresses used on the network.

A further understanding of the nature and advantages of the present invention may be realized by reference to the remaining portions of the specification and the drawings.

DETAILED DESCRIPTION

Figure 1:
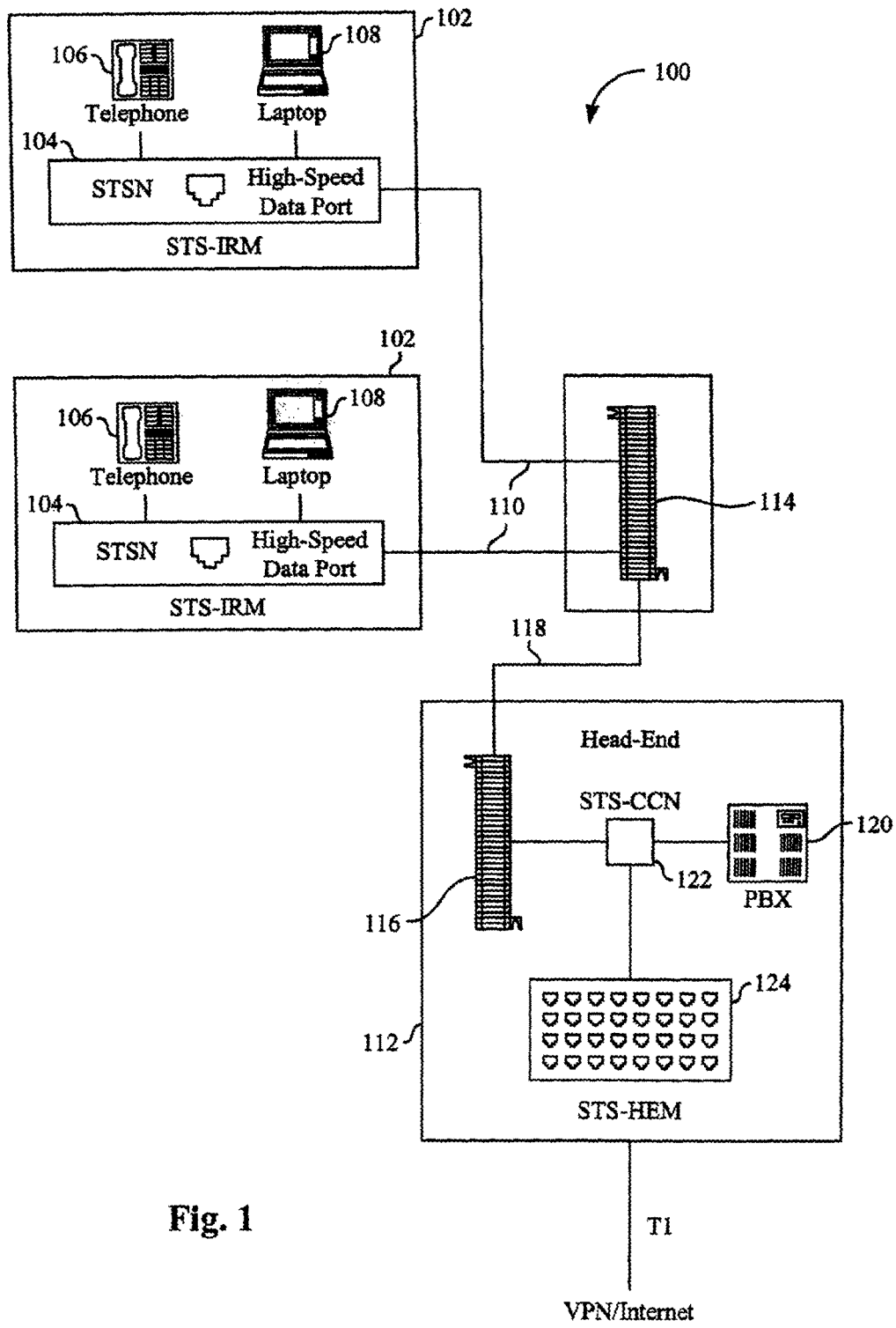
FIG. 1 is a block diagram illustrating the provision of high speed data and Internet access to guest rooms in a hotel according to a specific embodiment of the invention.

FIG. 1 is a block diagram illustrating the provision of high speed data and Internet access to guest rooms in a hotel network 100 according to a specific embodiment of the invention. In each guest room 102 is an in-room module (IRM) 104 by which a telephone 106 and a guest's laptop computer 108 may be connected to the hotel's wiring infrastructure. According to a specific embodiment, IRM 104 is plugged directly into the room's phone jack and has at least two additional ports, one for the room's telephone, e.g., an RJ-11 jack, and one for the guest's laptop, e.g., an RJ-45 Ethernet port. According to various embodiments, IRM 104 performs a number of functions including, for example, combining and separating Ethernet data and standard telephone signals for transmission over the hotel's wiring infrastructure. According to other embodiments and as discussed below, IRM 104 is configured to receive control information from a central location for automated control of various room environmental parameters, e.g., temperature and lighting. According to still other embodiments, IRM 104 is configured to receive a wide variety of other types of data such as, for example, digital audio and video for presentation in the guest room, or a wide variety of other information services.

Transmission line 110 connects IRM 104 to the hotel's head-end 112 via any of a wide variety of infrastructures. In the example shown, transmission line 110 connects IRM 104 to head-end 112 via standard telephone company wiring as represented by punch down blocks 114 and 116 and telephone company transmission line 118. It will be understood, however, that the wiring between IRM 104 and head-end 112 may take other forms such as, for example, a four-conductor Ethernet network. Head-end 112 comprises punch down block 116 and public branch exchange (PBX) 120. Interposed between punch down block 116 and PBX 120 is a connection port 122 which, according to a specific embodiment, may be easily installed simply by unplugging the standard 24-pin connector from PBX 120, plugging connection port 122 into the PBX connector (not shown), and plugging the original connector from punch down block 116 into connection port 122. Standard telephone signals pass through connection port 122 to PBX 120 while half duplex Ethernet data packets are transmitted and received by head-end module (HEM) 124.

Depending on the configuration of the present invention, HEM 124 performs a variety of functions and, according to some embodiments, can be thought of as an enhanced router with additional capabilities programmed into its operating system. That is, according to such embodiments, HEM 124 serves as a switch which routes data packets to and from IRMs 104, and serves as the other end of the communications to and from IRMs 104 in which Ethernet data and phone signals are combined over single twisted pair technology.

According to other alternative embodiments, HEM 124 handles address translation and assignment, controls network access, and serves as a bridge for Ethernet data transmitted over the hotel's single twisted pair infrastructure. HEM 124 has a plurality of ports 126 each of which communicates with a corresponding IRM 104. This communication may be individually monitored and controlled (by either the IRM or the HEM) thus allowing central hotel management of billing and access as well as the ability to generate reports for troubleshooting purposes.

Each IRM 104 (and thus the corresponding HEM port 126) has a fixed IP address which may be configured using the Simple Network Management Protocol (SNMP). If the guest's computer connected to a particular IRM 104 does not have its own internal IP address, the fixed IP address of the corresponding IRM 104/HEM port 126 is assigned to the guest's computer using the Dynamic Host Configuration Protocol (DHCP) to facilitate access to network 100. If the guest's computer already has its own internal IP address, address translation is performed between the computer's internal IP address and the fixed IP address of the IRM 104/HEM port 126. According to various embodiment of the invention, this address translation may be performed by either IRM 104 or HEM 124. HEM 124 has a small boot ROM (not shown) for basic IP communications and a large flash ROM (not shown) for fully functional software and configuration data. This allows for remote software upgrades using, for example, an encrypted protocol riding on top of IP.

Figure 2:
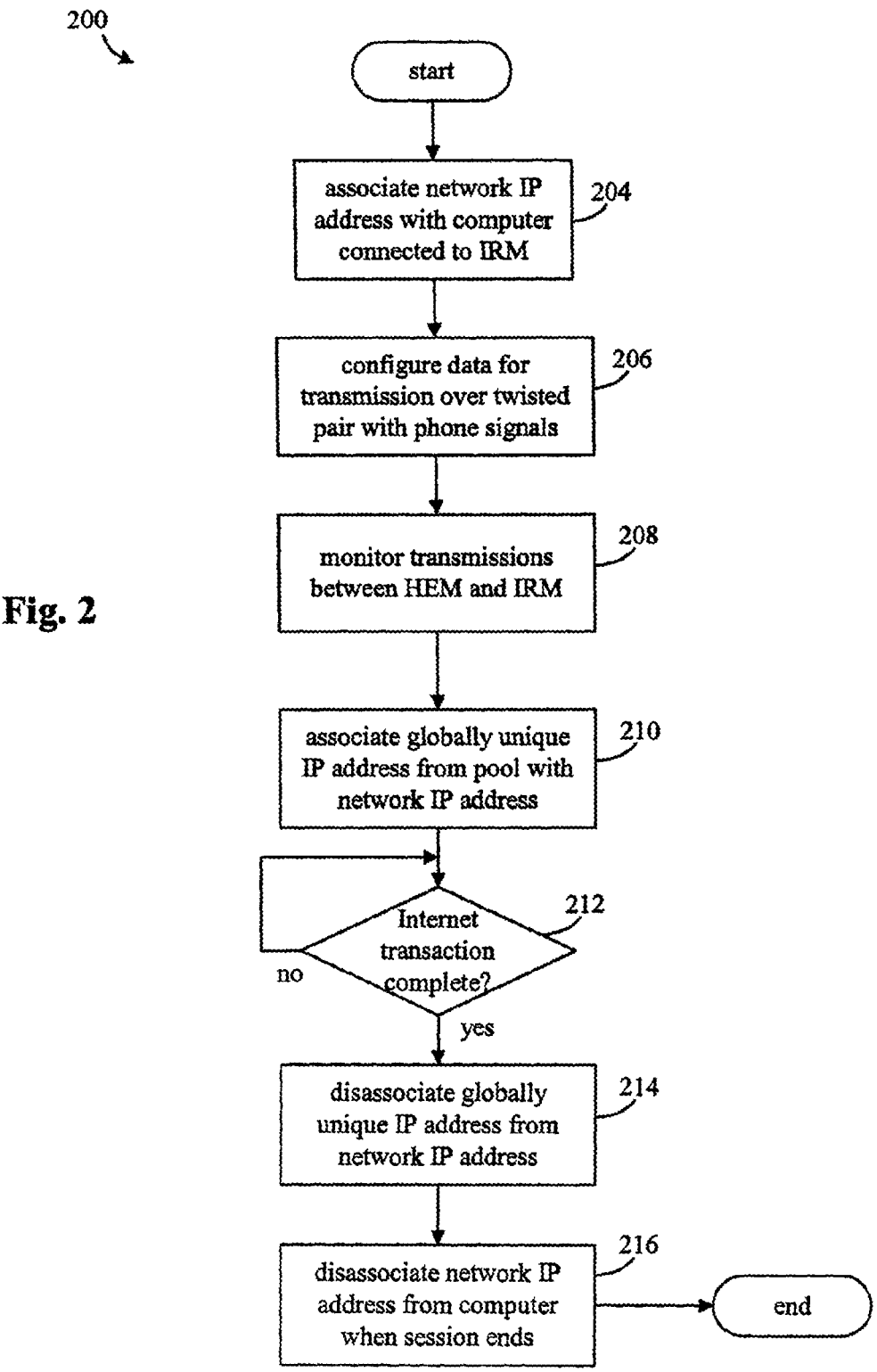
FIG. 2 is a flowchart illustrating a method for providing high speed data and Internet access to guest rooms in a hotel according to a specific embodiment of the invention.

FIG. 2 is a flowchart 200 illustrating a method for providing high speed data and Internet access to guest rooms in a hotel using the system of FIG. 1. When a guest's computer connects to an IRM in any one of the guest rooms, the network IP address associated with that IRM is associated with the computer (204). As discussed above, this association could mean a DHCP assignment of the network IP address to the guest's computer where the computer did not already have an internal IP address. It could also mean that the internal IP address of the computer is translated into the network IP address. This address assignment/translation may be effected by either the IRM and the HEM. In addition, it will be understood that depending on where the assignment/translation occurs it may precede or follow 206 described below. The network IP address is associated with the guest's computer while it remains connected to the IRM.

Where the transmission line connecting the IRM to the hotel network comprises a single twisted pair of conductors, the data communications between the IRM and the HEM are configured so that they may be transmitted substantially simultaneously over the single twisted pair with the standard telephone signals from the phone in the guest room (206). A specific technique by which this configuration is effected is described below with reference to FIGS. 3a and 4.

Once the connection is established, the communications between the IRM and the HEM are monitored either periodically or continuously for a variety of purposes (208). This information may be used by the hotel for billing purposes or for troubleshooting and improving the reliability of the hotel network.

If an Internet transaction is requested by the guest's computer, a globally unique IP address from a pool of such addresses is temporarily associated with the network IP address currently associated with the guest's computer using, for example, a network address translation protocol (210). As discussed above, the pool of addresses could be, for example, class A, B, or C addresses. As will be discussed below with reference to FIGS. 5 and 6, the temporary association of the globally unique IP address may be done by the HEM in the hotel or, according to another embodiment, by a remote server which interconnects one or more hotel properties in a wide area network. When the Internet transaction is complete (212), the globally unique IP address is disassociated from the network IP address and put back in the pool for use in facilitating subsequent Internet transactions from any of the hotel's guest rooms (214). The network IP address remains associated with the guest's computer until the session ends, e.g., the computer is disconnected from the IRM or powered down (216).

Figure 3A:
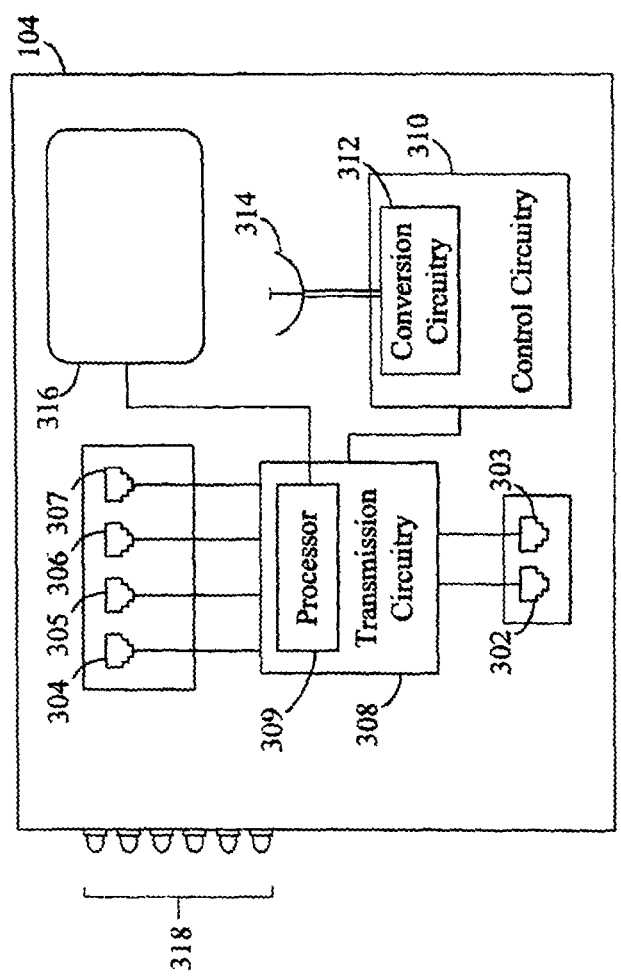
FIGS. 3*a* and 3*b* are more detailed block diagrams of the in-room module and head-end module of FIG. 1.
Figure 3B:
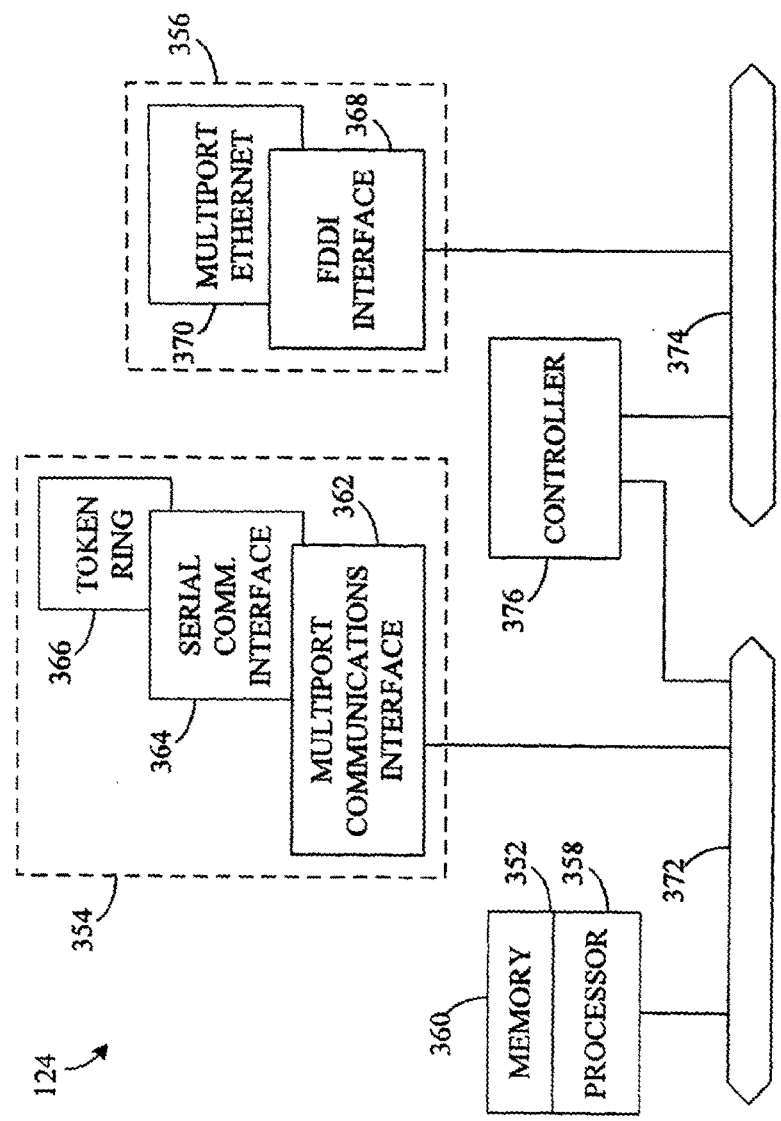

FIGS. 3a and 3b are more detailed block diagrams of IRM 104 and HEM 124 of FIG. 1, respectively. IRM 104 comprises connection circuitry for connecting the IRM to the room's standard telephone jack as well as the room's telephone and the guest's computer. According to a specific embodiment, the connection circuitry includes RJ-11 ports 302 for connecting to the phone and 303 for connecting to the wall jack, an Ethernet port 304, an iEEE 1394 port 305, and a universal serial bus (USB) port 306 for connecting to the guest's computer, and an additional data port 307 for receiving various types of data. iEEE 1394 port 305 and USB port 306 may, in some instances, prove more convenient than Ethernet port 304 in that certain network reconfiguration issues don't have to be dealt with. In addition, many business travelers often don't travel with the Ethernet dongle which is necessary for connecting their laptop's Ethernet port to a network Ethernet port. Thus, depending upon which of the two alternate standards, iEEE 1394 or USB, the laptop is configured for, IRM 104 is operable to translate the laptop's transmissions to the Ethernet standard.

Figure 4:
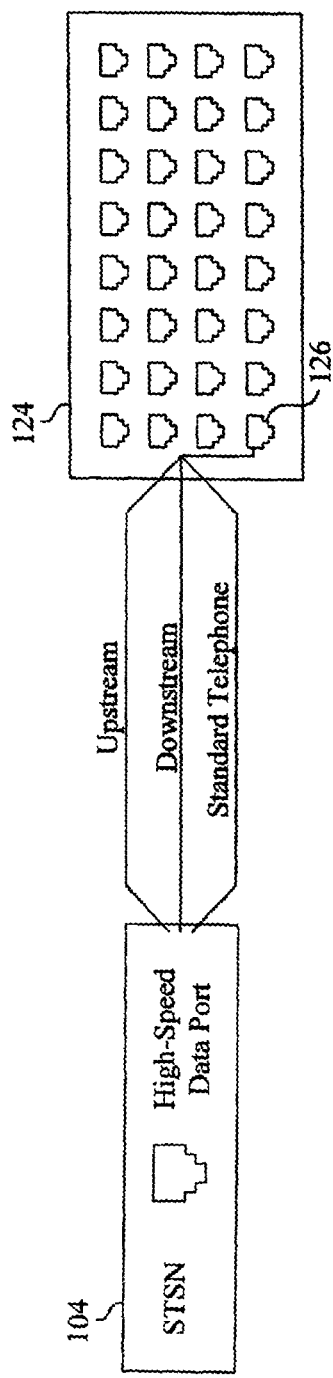
FIG. 4 is a block diagram illustrating the combination of half duplex data and standard telephone data on a single pair of conductors according to a specific embodiment of the invention.

According to a specific embodiment, IRM 104 also includes transmission circuitry 308 for transmitting and receiving data on a single twisted pair of conductors of which the majority of hotel wiring infrastructures are comprised. According to one embodiment, a portion of transmission circuitry 308 is implemented according to the home PNA (Phone-line Networking Alliance) standard which allows half duplex data and phone signals on the same line as illustrated by the diagram of FIG. 4. According to the home PNA standard, data transmissions from IRM 104 to a port 126 of HEM 124 and transmissions from the HEM to the IRM are alternated at a frequency in the range of 4-9 MHz. Because standard phone signals exists at a relatively low frequency compared to the home PNA modulation frequency, all of the signals may easily exist on a single pair of wires.

According to a specific embodiment, transmission circuitry 308 is operable to associate the network IP address associated with IRM 104 with the guest's computer. That is, the address translation or assignment which allows the guest access to the local or wide area network is performed by the transmission circuitry in the IRM. According to a more specific embodiment, transmission circuitry 308 includes a processing unit 309 based on RISC microprocessor which performs the address translation, the combining and separation of signals for transmission to the headend, and the routing of the received signals to the appropriate IRM port. According to a specific embodiment, processing unit 309 comprises an Intel 80960VH and the appropriate support circuitry.

According to another specific embodiment, IRM 104 also includes control circuitry 310 for receiving control information via the hotel's network for controlling one or more control systems 311 proximate to the IRM. As will be discussed below with reference to FIG. 9, such control systems may include, for example, the room's temperature control, lighting, and audio systems. In one embodiment, the control circuitry includes conversion circuitry 312 for converting the received control information into the necessary control signals for actually controlling the in-room control systems. The conversion circuitry may include, for example, an RF transmission element 314 (e.g., an antenna) for transmitting RF control signals to the various control systems. According to an alternative embodiment, conversion circuitry 312 includes an infrared transmission element (e.g., an IR diode) for transmitting infrared control signals to various control systems.

Transmission circuitry 308 (using processor 309) discriminates between the various data it receives and directs it to the appropriate port on IRM 104 according to address information in data packet headers. According to a specific embodiment, digital audio and video may be transmitted to individual rooms via the system described herein. The digital audio and video are directed to additional data port 307 to which an audio and/or video system may be connected for presenting the transmitted content. In this way, an ambience may be set for the guest's arrival. In addition, the guest could select a wide variety of entertainment and information services via the hotel network which may then be transmitted to the guest's room via the auxiliary data port 307 on IRM 104. According to one embodiment, data port 307 receives audio data which directly drives a pair of speakers in the guest room.

Specific embodiments of IRM 104 also include an LED or LCD display 316 on which status and other information may be communicated to the occupant of the guest room whether or not they are currently connected. For example, before a connection is made, display 316 could be used to inform the hotel guest of all of the services available through IRM 104 as well as instructions for connecting to IRM 104. Other information such as stock quotes and weather information may also be presented continuously or periodically. Once connected, display 316 could communicate the status of the connection as well as the time connected and current connection charges. It will be understood that a wide variety of other information may be presented via display 316.

IRM 104 may also include an array of individual colored LEDs 318 which provide information to the user. Such LEDs may indicate, for example, the connection status of the IRM, i.e., whether it is connected to the HEM, using red or green LEDs. LEDs 318 may also be configured to indicate a purchase status to the user. That is, because connection services are often purchased in 24 hour blocks, LEDs 318 may indicate to the user whether she is operating within a block of time which has already been paid for (green), whether the end of the current block is approaching (yellow), or whether she has already entered the next time block (red). LEDs 318 could also indicate which type of connection the user has established, e.g., USB, Ethernet, or IEEE 1394.

As mentioned above and as shown in FIG. 3*b*, HEM 124 may be thought of as an enhanced router which routes data packets to and from IRMs 104, controls network access, serves as a bridge for Ethernet data transmitted over the hotel's single twisted pair infrastructure, and, according to some embodiments, handles address translation and assignment. According to one embodiment, a 2611 router from Cisco Systems, Inc. is used to implement HEM 124. HEM 124 includes a master central processing unit (CPU) 352, low and medium speed interfaces 354, and high-speed interfaces 356. When acting under the control of appropriate software or firmware, the CPU 352 is responsible for such router tasks as routing table computations and network management. It may also be responsible for controlling network access and transmissions, etc. It preferably accomplishes all these functions under the control of software including an operating system (e.g., the Internet Operating System (IOS®) of Cisco Systems, Inc.) and any appropriate applications software. CPU 352 may include one or more microprocessor chips 358. In a specific embodiment, a memory 360 (such as non-volatile RAM and/or ROM) also forms part of CPU 352. However, there are many different ways in which memory could be coupled to the system.

The interfaces 354 and 356 are typically provided as interface cards (sometimes referred to as "line cards"). Generally, they control the sending and receipt of data packets over the network and sometimes support other peripherals used with HEM 124. The low and medium speed interfaces 354 include a multiport communications interface 362, a serial communications interface 364, and a token ring interface 366. The high-speed interfaces 356 include an FDDI interface 368 and a multiport Ethernet interface 370. Preferably, each of these interfaces (low/medium and high-speed) includes (1) ports for communication with the appropriate media, (2) an independent processor, and in some instances (3) volatile RAM. The independent processors control such communications intensive tasks as packet switching, media control and management. By providing separate processors for the communications intensive tasks, this architecture permits the master microprocessor 352 to efficiently perform routing computations, network diagnostics, security functions, etc.

The low and medium speed interfaces 354 are coupled to the master CPU 352 through a data, control, and address bus 372. High-speed interfaces 356 are connected to the bus 372 through a fast data, control, and address bus 374 which is in turn connected to a bus controller 376.

Although the system shown in FIG. 3*b* is one type of router by which the present invention may be implemented, it is by no means the only router architecture by which the present invention may be implemented. For example, an architecture having a single processor that handles communications as well as routing computations, etc. would also be acceptable. Further, other types of interfaces and media could also be used with the router.

Regardless of network device's configuration, it may employ one or more memories or memory modules (including memory 360) configured to store program instructions for the network operations and network access and control functions described herein. The program instructions may specify an operating system and one or more applications, for example. Such memory or memories may also be configured to store, for example, control information for controlling in-room control systems, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Referring back to FIG. 3b, HEM 124 has a plurality of ports 126 each of which communicates with a corresponding IRM 104. HEM 124 has the ability to sense when any of ports 126 are being used so that the hotel may bill the user accordingly. This monitoring feature is also useful for technical support, network bandwidth requirement estimates, billing estimates, and buying pattern data. HEM 124 also has the capability of enabling and disabling individual ports 126. Where network 100 is part of a wide area network (as discussed below), the monitoring, enabling, and disabling of ports 126 may be done from a remote server at the center of the WAN.

As described above, each HEM port 126 (and thus the corresponding IRM 104) has a fixed IP address which may be configured using SNMP. The fixed IP address of the HEM port 126 and the IRM 104 is assigned to the guest's computer using DHCP. Alternatively, an address translation is performed between the computer's internal IP address and the fixed IP address of IRM 104/HEM port 126. HEM 124 has a small boot ROM 378 for basic IP communications and a large flash ROM 380 for fully functional software and configuration data. This allows for remote software upgrades using, for example, an encrypted protocol riding on top of IP.

According to various embodiments, HEM 124 also comprises transmission circuitry 316 for transmitting and receiving data on a single twisted pair of conductors. Thus, the Ethernet data which has been combined with the standard telephone signals at IRM 104 may be picked off and reconfigured for transmission according to standard Ethernet techniques. Also, data headed to IRM 104 may be combined for transmission over the single twisted pair. As with transmission circuitry 308, transmission circuitry 316 may be implemented according to the home PNA standard.

Figure 5:
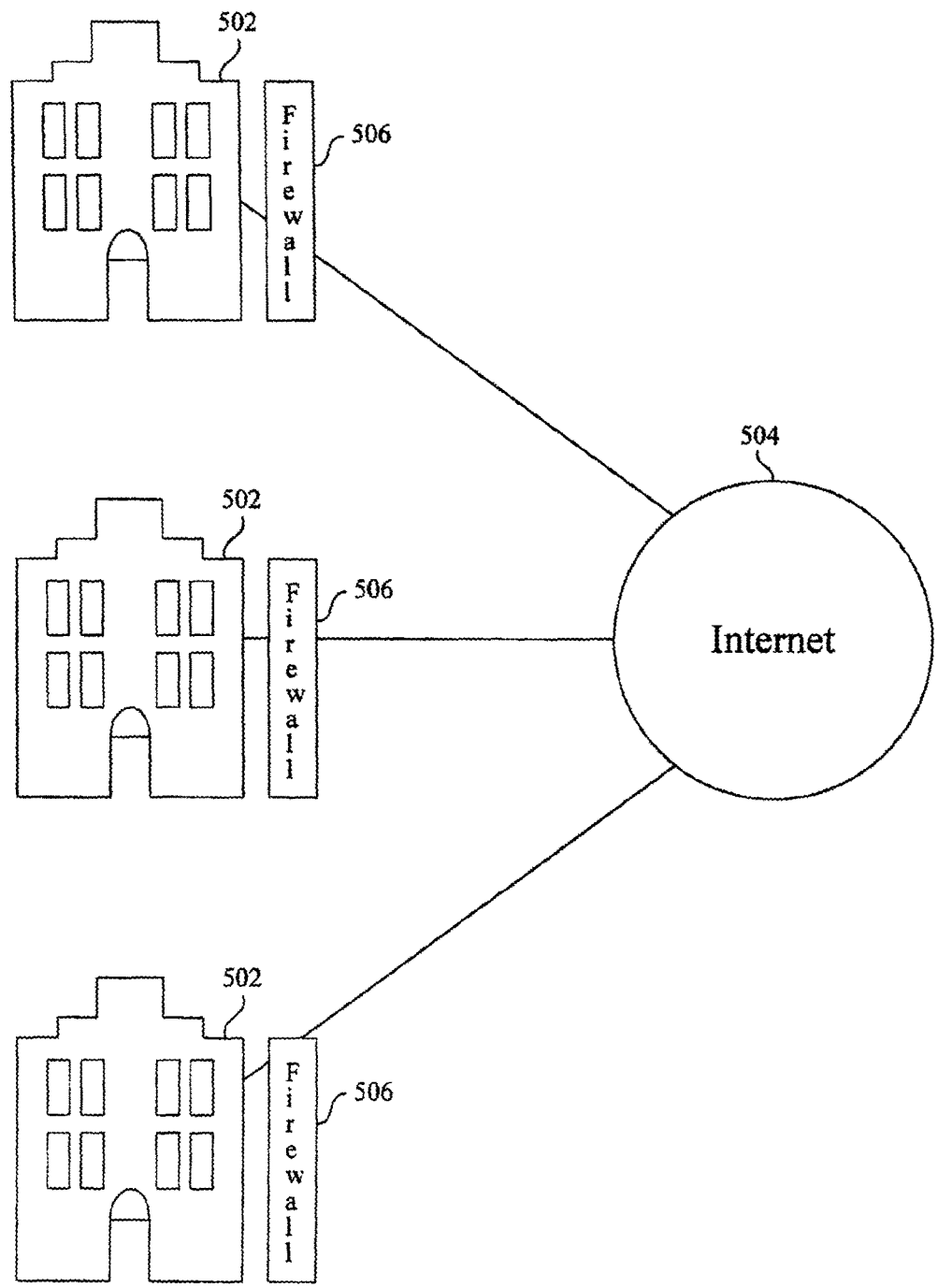
FIG. 5 is a block diagram illustrating the provision of high speed data and Internet access to guest rooms in hotels according to another specific embodiment of the invention.

FIG. 5 is a block diagram illustrating the provision of high speed data and Internet access to guest rooms in a chain of hotels 502 according to one embodiment of the invention. Using the internal infrastructure described above with reference to FIG. 1, each hotel 502 has a local area network (LAN) (not shown) which provides direct access to the Internet 504 for each of its guest rooms. According to this embodiment, each hotel 502 must provide its own security in the form of a firewall 506 for the protection of its LAN.

Figure 6:
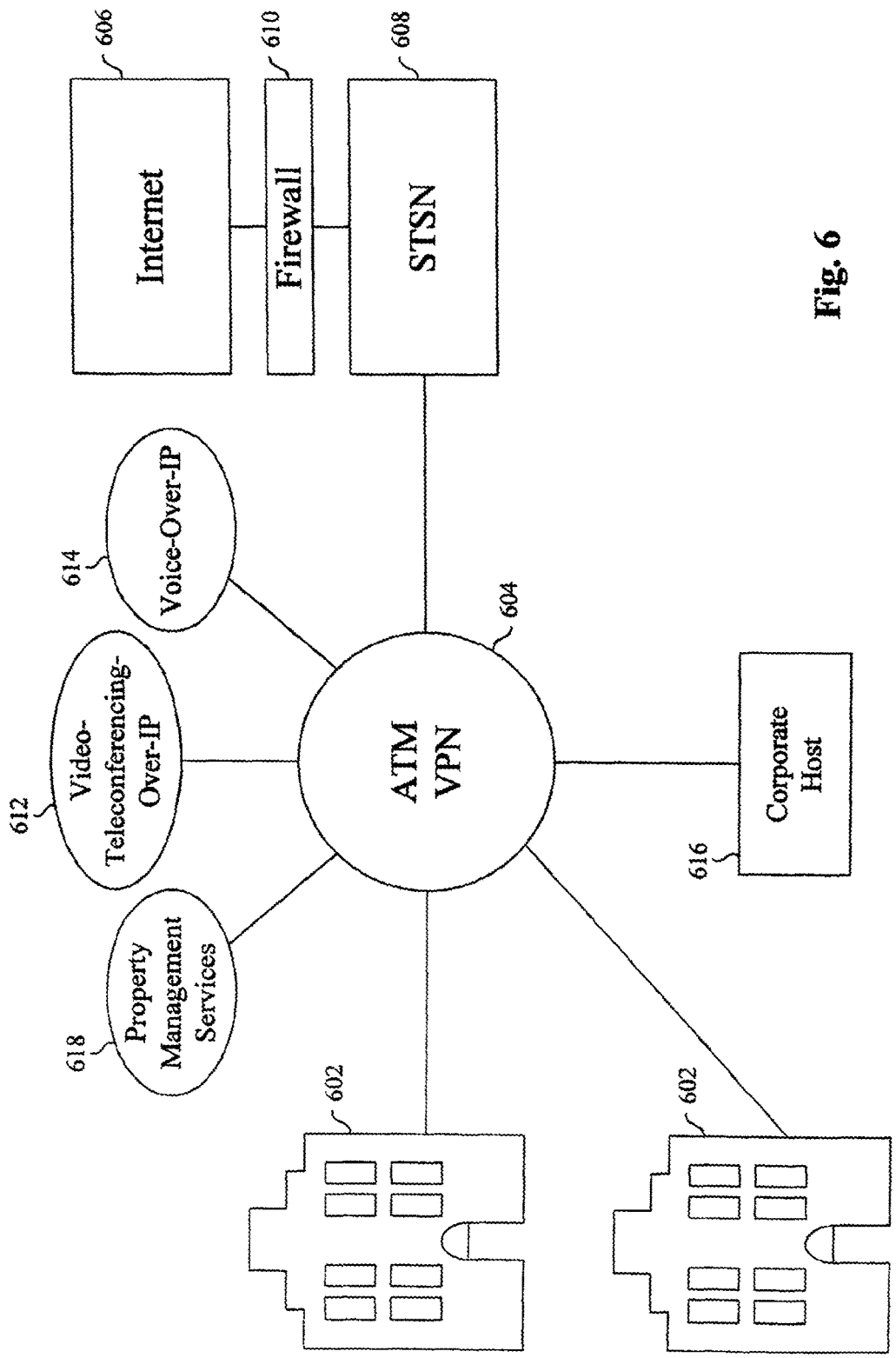
FIG. 6 is a block diagram illustrating the provision of high speed data and Internet access to guest rooms in hotels according to yet another specific embodiment of the invention.

FIG. 6 is a block diagram illustrating the provision of high speed data and Internet access to guest rooms in a chain of hotels 602 according to another embodiment of the invention. Using the internal infrastructure described above with reference to FIG. 1, each hotel 602 has a LAN (not shown) which is then connected with other LANs in the other hotels 602 to form a wide area network (WAN) referred to herein as a virtual private network (VPN) 604. According to a specific embodiment, VPN 604 is built on an optical fiber backbone employing asynchronous transfer mode (ATM) technology to transmit data packets. It will be understood however that any of a variety of transmission protocols and infrastructures may be employed to transmit data in such a network without departing from the scope of the present invention. Such protocols may include but are not limited to frame relay, Ethernet, and FDDI. Data are configured in the appropriate format as they leave each hotel 602 by a framer (not shown) which may be part of or associated with each hotel's router or file server.

The embodiment of FIG. 6 provides several advantages over the embodiment described above with reference to FIG. 5. High speed access to the Internet requires some form of connection to the Internet such as, for example, a T1 or T3 line. Not only does such a connection require a hardware infrastructure to support it, it also necessitates some form of protection for the network in the form of, for example, a firewall. Thus, if each hotel property in a hotel chain were to be directly connected to the Internet (as shown in FIG. 5), each property would need to have its own network hardware infrastructure, firewall, and the technical and administrative staff and functions to support the same. By contrast, with VPN 604, access to the Internet 606 is provided via a single network center (represented by remote network operation center (NOC) server 608) at which one or more firewalls 610 and any other necessary networking hardware and equipment may be located and managed. According to a specific embodiment, a redundant network center is provided in a different city than the first against the event that one or the other goes down.

Having each hotel property directly connected to the Internet is problematic for effecting control of the hotels from a central location. That is, the more each hotel LAN is amenable to control from a central location, the more vulnerable it is to hacking. With VPN 604, security is complete and centralized control is virtually unlimited. This makes things like remote software upgrades convenient thus eliminating what might otherwise be significant field service costs. In addition, because much of the equipment is centrally located, the costly redundancy of equipment and support functions at each hotel property made necessary by the embodiment of FIG. 5 is avoided.

Another important benefit of VPN 604 relates to the management of globally unique IP addresses. As mentioned above, there is a paucity of pools of globally unique IP addresses which are sufficiently large to accommodate each host on the networks of most medium to large size organizations. For example, one pool of class C addresses accommodates less than 256 simultaneous users on a network. This might be sufficient at most hotels much of the time, but it is clear that there are foreseeable circumstances where it would not be. For example, as mentioned above, if a 1200 room hotel hosted an Internet technologies seminar it is highly likely that such a pool of addresses would not be sufficient. In addition, this scenario makes the assumption that each property in a hotel chain (some comprising over 1000 properties) could procure a pool of class C addresses.

VPN 604 addresses this problem in that it spreads the IP address needs of each of the hotel properties over the resources of the entire wide area network. Thus, for example, a single class B pool of addresses might be used to accommodate all of the Internet access needs of an entire hotel chain even where the total number of rooms in the chain far exceeds the number of available globally unique IP addresses. That is, large bursts of IP address needs may occur simultaneously at dozens of the hotel properties without exhausting the nearly 64,000 globally unique addresses available in the class B pool.

Other secure services may also be provided via VPN 604. For example, video teleconferencing-over-IP 612 and voice-over-IP communications 614 may be provided to hotel guests. Moreover, by arranging access to VPN 604 by corporate hosts 616, individual employees of those corporations can have secure access to their employer's network from remote locations. Other services such as, for example, property management services 618 may be provided to the management of hotels 602.

Figure 7:
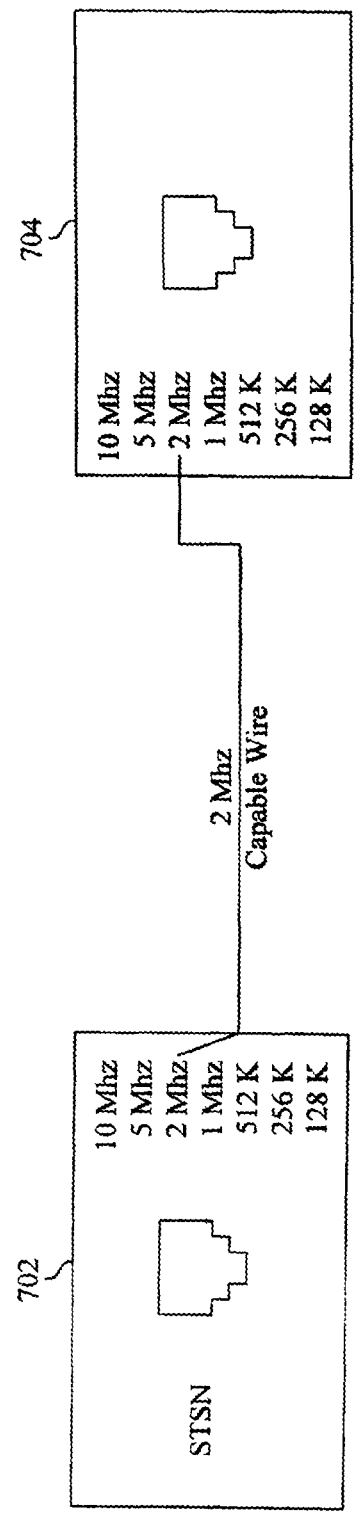
FIG. 7 is a block diagram illustrating the auto-bauding technique of the present invention.
Figure 8:
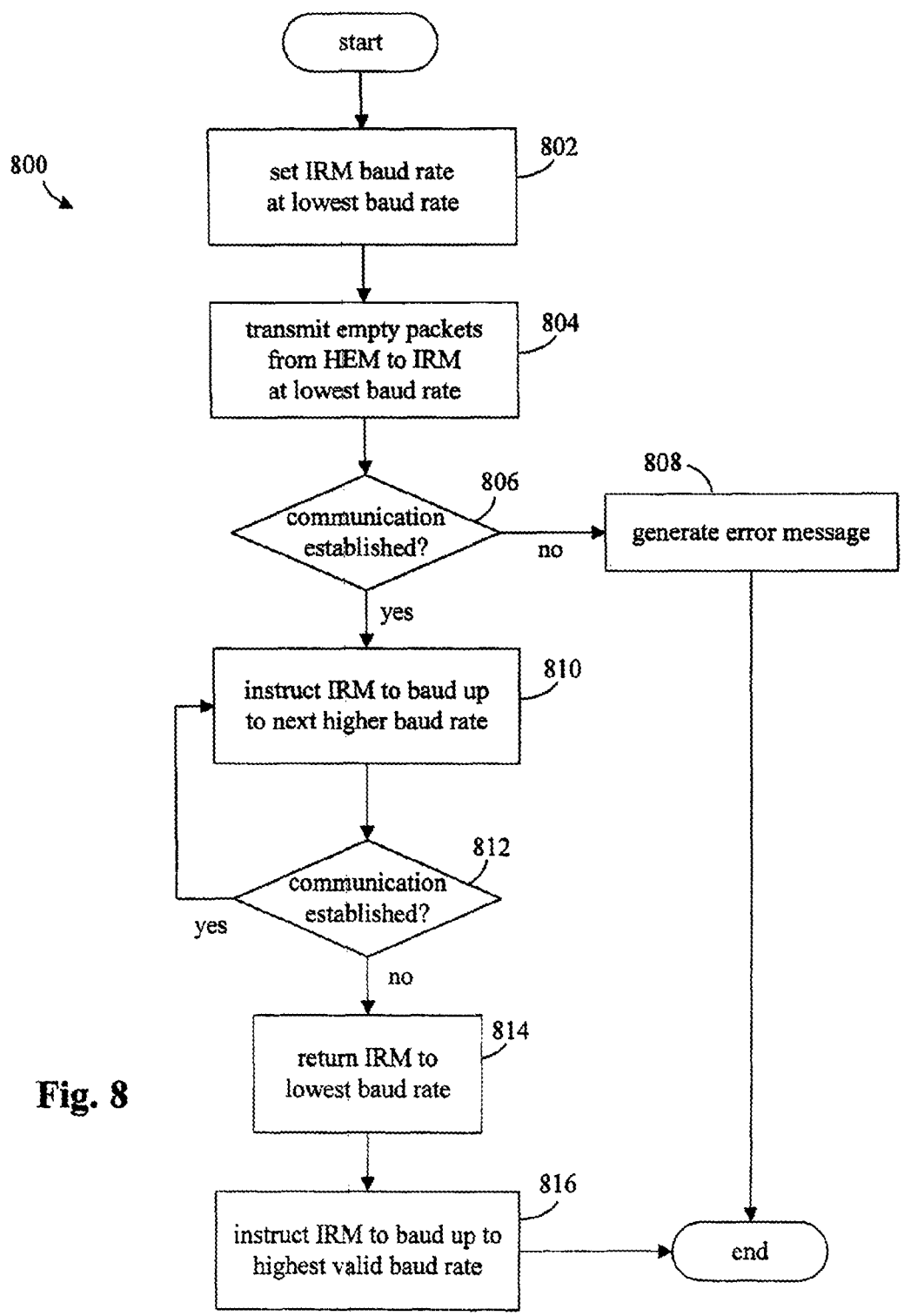
FIG. 8 is a flowchart illustrating the auto-bauding technique of the present invention.

FIG. 7 is a block diagram illustrating an auto-bauding technique which may be employed with certain alternative embodiments of the present invention. FIG. 8 is a flowchart 800 illustrating the same. Every transmission line in a hotel's wiring infrastructure has different transmission characteristics due to its length and proximity to sources of distortion. Therefore, according to a specific embodiment of the invention in which an alternative to the home PNA standard is employed, IRM 702 and HEM 704 are operable to determine the maximum data rate for each guest room individually. That is, instead of using a single rate to accommodate the slowest transmission line in the network, each room is allowed a data rate which is the maximum allowed by its transmission line. On power, IRM 702 goes to its lowest baud rate, i.e., 128 kHz (802). HEM 704 transmits empty packets at 400 microsecond intervals while IRM listens at its current baud rate (804). If communication is not established (806), an error message is generated notifying the network administrator that IRM 702 is not operational (808). If, however, communication is established (806), HEM 704 instructs IRM 702 to baud up to the next higher rate (810). If communication is established at the next higher rate (812), HEM 704 again instructs IRM 702 to baud up to the next higher rate (810). This occurs iteratively until a baud rate is reached at which communication cannot be established. At that point, IRM 702 returns to the lowest baud rate (814) and HEM 704 instructs IRM 702 to baud up to the highest baud rate at which communication was established (816). In this way, data to and from IRM 702 will always be transmitted at the maximum allowable rate.

Figure 9:
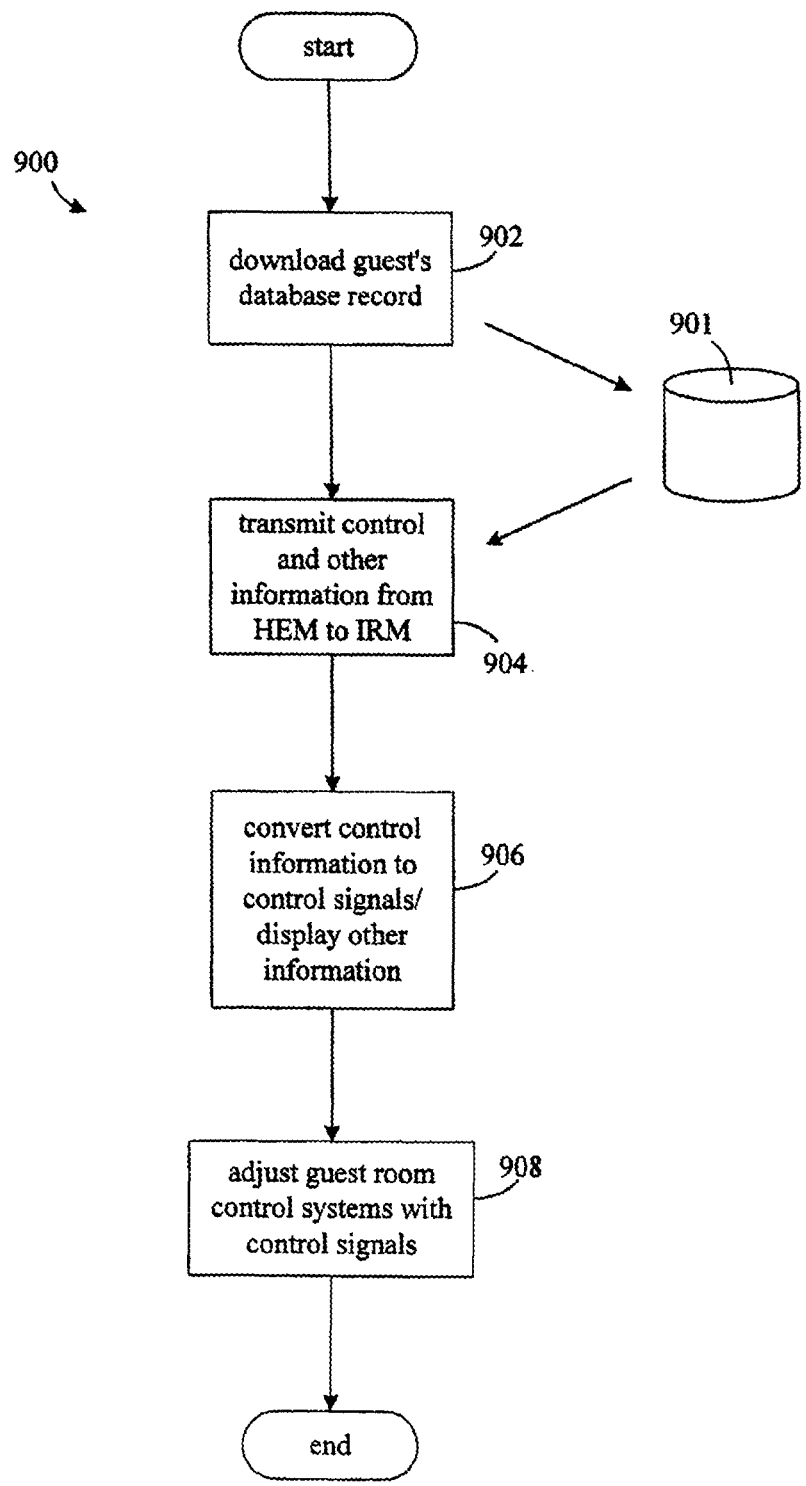
FIG. 9 is a flowchart illustrating the customization of a guest room and the transmission of control information to in-room systems via a hotel network.

FIG. 9 is a flowchart 900 illustrating the customization of a guest room and the transmission of control information to in-room systems via a hotel network. The ability of the present invention to provide half duplex data to each guest room over a single twisted pair connection provides additional advantages which are likely to engender further hotel customer loyalty. In recent years, the hospitality industry has been looking for customization solutions to tailor guest rooms to the needs and preferences of the individual guest. The belief is that this would go a long way toward creating the type of customer loyalty with the business traveler that airlines have created with frequent flyer programs. The basic idea is that a hotel or hotel chain keeps a database record for frequent guests in which a variety of parameters may be specified such as, for example, room temperature, lighting, background music, etc. Other customization options include various information services preferred by the guest such as, for example, stock quotes, weather reports, entertainment calendars, etc.

When the guest checks in, the assigned room is then automatically configured to suit that guest's preferences.

One method of configuring the room automatically involves adjusting various controls in the room via remote control signals such as, for example, radio frequency (RF) or infrared signals. According to a specific embodiment of the invention, control signals are sent to the IRM (e.g., IRM 104 of FIGS. 1 and 3a) in the guest room via the hotel network where they are converted to the appropriate form, e.g., RF, and used to set the room controls appropriately. In this way, the room's thermostat, light controls, and stereo controls may be set to provide a comfortable and familiar environment for the newly arrived guest. And, because the present invention allows half duplex data to be combined with standard telephone signals, the transmission of room control signals may be done in this manner even where the hotel wiring consists of only single twisted pair technology. In addition and as described above, digital audio and video signals as well as digital information services may be sent to the room in the same manner providing further customization capabilities. Thus, the guest room customization solution of the present invention provides a powerful tool by which individual hotels and hotel chains may engender greater customer loyalty and thereby realize increased revenues.

Referring now to FIG. 9, a specific embodiment of the invention will now be described. As described above, specific information for an individual guest is maintained in a database record 901 either on the server of a specific hotel or on a central remote server from which it may be downloaded to the specific hotel at which the corresponding guest is scheduled to arrive or is actually checking in (902). As the guest is checking in or in response to some other appropriate event, information regarding the guest's room environment and other preferences in database record 901 is transmitted from the HEM to the IRM in the guest's assigned room (904). The information is transmitted via the hotel network which may comprise the hotel's single twisted pair telephone wiring infrastructure.

The in-room module then displays some of the received information, e.g., stock quotes, and converts some of the received information into an appropriate set of control signals, e.g., RF signals, for communicating with the rooms various environmental controls (906). These environmental controls may include, for example, the thermostat, lighting controls, stereo controls, television controls, etc. The appropriate adjustments are then made to the various systems in the guest room to provide the optimal environment specifically suited to the stated preferences of the arriving guest (908).

Figure 10:
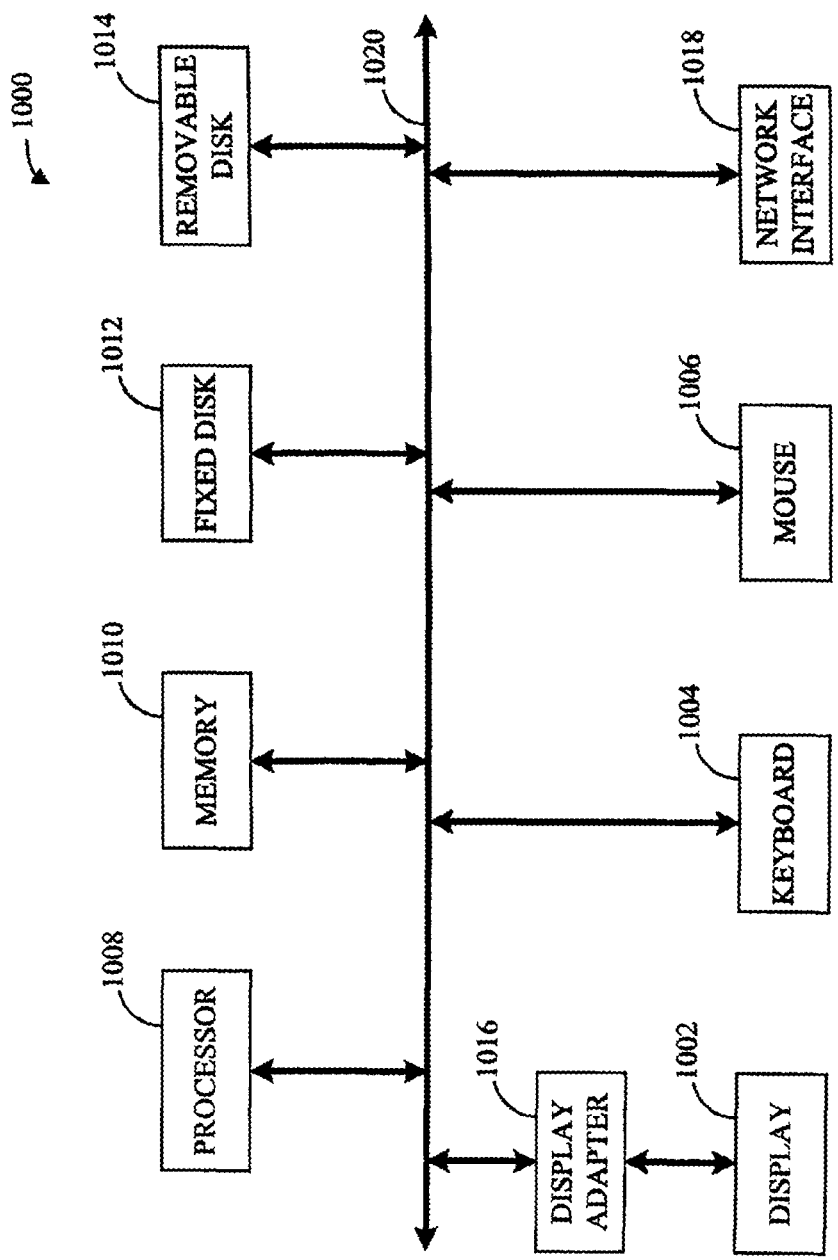
FIG. 10 is a block diagram of file server for use with various embodiments of the present invention.

FIG. 10 is a block diagram of a file server 1000 for use with various embodiments of the present invention. File server 1000 may be used, for example, to implement any of HEM 124 of FIGS. 1 and 3a, firewall 506 of FIG. 5, and firewalls 610 and remote server 608 of FIG. 6. File server 1000 includes display 1002 and keyboard 1004, and mouse 1006. Computer system 801 further includes subsystems such as a central processor 1008, system memory 1010, fixed disk storage 1012 (e.g., hard drive), removable disk 1014 (e.g., CD-ROM drive), display adapter 1016, and network interface 1018 over which LAN, WAN, and Internet communications may be transmitted. File server 1000 operates according to network operating system software and may perform other functions such as, for example, file and database management. Other systems suitable for use with the invention may include additional or fewer subsystems. For example, another system could include more than one processor 1008 (i.e., a multi-processor system), or a cache memory (not shown).

The system bus architecture of file server 1000 is represented by arrows 1020. However, these arrows are illustrative of any interconnection scheme serving to link the subsystems. For example, a local bus could be utilized to connect the central processor to the system memory. File server 1000 is but an example of a system suitable for use with the invention. Other architectures having different configurations of subsystems may also be utilized.

Figure 11:
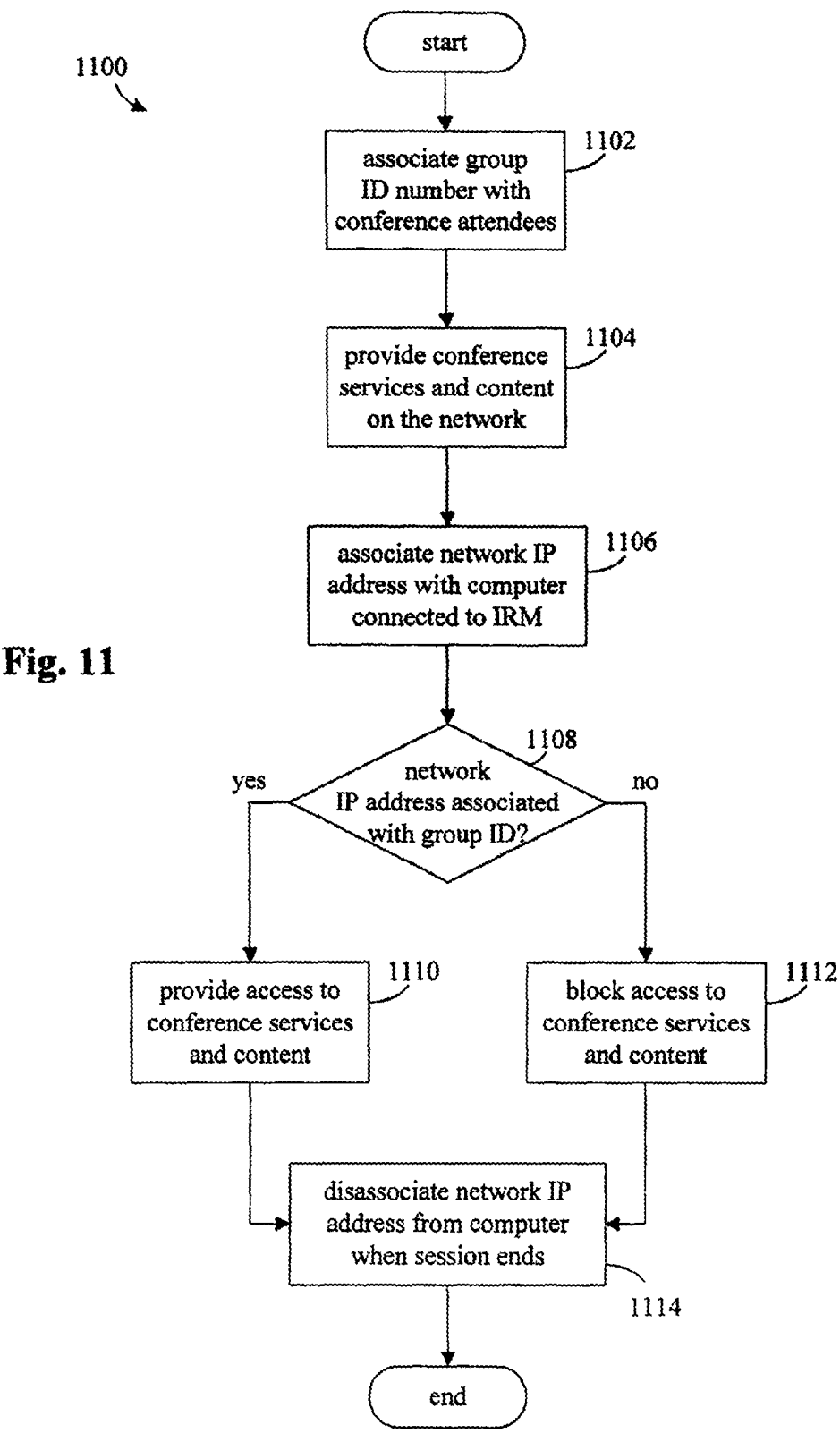
FIG. 11 is a flowchart illustrating the providing of online conference services.

Various embodiments of the present invention may be used to provide special levels of service to specific groups such as, for example, the attendees of a conference at a hotel property. That is, conference attendees are identified when they connect to the hotel network and are provided access to specific content and online services which are related to the conference. FIG. 11 is a flowchart 1100 illustrating the providing of such online conference services using various ones of the network infrastructures described above such as, for example, the network environments of FIGS. 1, 3a, 3b, 5 and 6. A group identification number or tag is associated with each of the attendees of a specific conference (1102).

According to a specific embodiment, this is accomplished by associating the network addresses of the IRMs in each of the guest rooms occupied by one of the attendees with the group ID tag. Conference specific services and content are then provided on the network (1104).

Conference services might include, for example, substantially real time voice communication and/or video teleconferencing with other attendees of the conference. Speakers or conference organizers may have software they want to distribute to attendees electronically. Only conference attendees have access to such electronic information. Conference specific content such as, for example, electronic copies of papers presented at the conference as well as PowerPoint® presentations are provided. Individual presenters at the conference can post follow up notes and answers to questions they were not able to get to during their presentation. Chat Rooms could be provided in which, at the end of the day, conference members can get online from their room to interact with other members. Only conference members would have access to the chat room. This service allows conference attendees to discuss questions and comments about the conference, talk about the sessions that were good and bad, critique speakers, and in general exchange information with other attendees. According to various embodiments, the chat rooms could be recorded and the information provided to conference organizers to allow them to better serve their members at future conferences. The real names of chat room participants may be excluded from this information. Bulletin boards for the posting of information by any conference attendee may also be provided. Discounted access to other services such as, for example, entertainment and information services, may also be provided.

As described above with reference to FIG. 2, when a guest's computer connects to an IRM in any one of the guest rooms, the network IP address associated with that IRM is associated with the computer (1106). As discussed above, this association could mean a DHCP assignment of the network IP address to the guest's computer where the computer did not already have an internal IP address. It could also mean that the internal IP address of the computer is translated into the network IP address. This address assignment/translation may be effected by the IRM, the HEM, or a remote server where the hotel is part of a virtual private network as described above with reference to FIG. 6.

If the network IP address associated with a particular guest's computer is associated with the group ID tag (1108), access to the conference specific services and content are provided to the user of that computer (1110). If, on the other hand, the network IP address is not associated with the group ID (1108), access to the conference specific services and content is blocked. The network IP address remains associated with the guest's computer until the session ends, e.g., the computer is disconnected from the IRM or powered down (1114).

The technique described above with reference to FIG. 11 could be used more generally to restrict access to particular services, content, web sites, other networks, etc. to specific identifiable groups. For example, when an employee of a particular corporation checks into the hotel, the network IP address of the IRM in that employee's room may be associated with a group ID tag which will enable access to the corporation's computer (e.g., see computer host 616 of FIG. 6). As will be understood, restriction of access to a variety of content and services in this manner may be effected according to a variety of group identifications without departing from the scope of the present invention.

While the invention has been particularly shown and described with reference to specific embodiments thereof, it will be understood by those skilled in the art that changes in the form and details of the disclosed embodiments may be made without departing from the spirit or scope of the invention. For example, many of the embodiments described herein have been described with reference to hotels. It will be understood, however, that the techniques employed by the present invention may be applied to a variety of structures and institutions such as, for example, schools, office buildings, and the like. In addition, several embodiment described herein employ single twisted pair wiring which is the standard telephone wiring found in most buildings. However, it will be understood that the techniques described herein may be implemented on any of a wide variety of wiring infrastructures including, for example, Ethernet and ATM systems. Therefore, the scope of the invention should be determined with reference to the appended claims.

What is claimed is:

1. A method of providing Internet access to a computer via a first one of a plurality of network access nodes in a local area network, the local area network having a pool of one or more globally unique IP addresses; the method comprising:
   translating from an internal IP address of the computer to a locally unique IP address of the local area network to thereby provide the computer with access to the local area network;
   monitoring network transmissions received from the first network access node in order to determine that the computer is requesting an Internet transaction;
   temporarily associating a globally unique IP address selected from the pool of globally unique IP addresses with the locally unique IP address in response to the computer requesting the Internet transaction; and
   translating from the locally unique IP address to the globally unique IP address during the Internet transaction to thereby provide the computer with access the Internet.

2. The method of claim 1, further comprising disassociating the globally unique IP address from the locally unique IP address after the Internet transaction is completed.

3. The method of claim 1, further comprising returning the globally unique IP address to the pool so it is available for association with other computers on the local area network after the Internet transaction is completed.

4. The method of claim 1, wherein the local area network is installed at a hospitality establishment and the computer is operated by a guest of the hospitality establishment.

5. The method of claim 1, wherein:
   the local area network is installed at a hospitality establishment having a plurality of guest rooms; and
   the pool of globally unique IP addresses is less in number than a total number of the guest rooms of the hospitality establishment.

6. The method of claim 1, wherein the pool of globally unique IP addresses is less in number than a maximum number of hosts supported by the network access nodes.

7. The method of claim 1, wherein the locally unique IP address that is associated with the computer is not a globally unique IP address.

8. The method of claim 1, wherein the first network first network access node comprises an Ethernet port and the computer is coupled to the first network access node via the Ethernet port.

9. The method of claim 1, wherein a total number of the one or more globally unique IP addresses is dynamically expandable over a virtual private network (VPN).

10. The method of claim 1, wherein the one or more globally unique IP addresses form a pool of globally unique IP addresses, and the pool of globally unique IP addresses is shared by a plurality of hospitality establishments.

11. An apparatus providing Internet access to a computer via a first one of a plurality of network access nodes in a local area network, the local area network having a pool of one or more globally unique IP addresses, the apparatus comprising:
- a first communication interface coupled to the local area network;
- a second communication interface coupled to the Internet;
- a central processing unit comprising one or more processors coupled to the first and second communication interfaces; and
- a memory device storing program instructions that when executed by the one or more processors cause the one or more processors to:
  - translate from an internal IP address of the computer to a locally unique IP address of the local area network to thereby provide the computer with access to the local area network;
  - monitor network transmissions received from the first network access node in order to determine that the computer is requesting an Internet transaction;
  - temporarily associate a globally unique IP address selected from the pool of globally unique IP addresses with the locally unique IP address in response to the computer requesting the Internet transaction; and
  - translate from the locally unique IP address to the globally unique IP address during the Internet transaction to thereby provide the computer with access the Internet.

12. The apparatus of claim 11, wherein the program instructions cause the one or more processors to disassociate the globally unique IP address from the locally unique IP address after the Internet transaction is completed.

13. The apparatus of claim 11, wherein the program instructions cause the one or more processors to return the globally unique IP address to the pool so it is available for association with other computers on the local area network after the Internet transaction is completed.

14. The apparatus of claim 11, wherein the local area network is installed at a hospitality establishment and the computer is operated by a guest of the hospitality establishment.

15. The apparatus of claim 11, wherein:
- the local area network is installed at a hospitality establishment having a plurality of guest rooms; and
- the pool of globally unique IP addresses is less in number than a total number of the guest rooms of the hospitality establishment.

16. The apparatus of claim 11, wherein the pool of globally unique IP addresses is less in number than a maximum number of hosts supported by the network access nodes.

17. The apparatus of claim 11, wherein the locally unique IP address that is associated with the computer is not a globally unique IP address.

18. The apparatus of claim 11, wherein the first network first network access node comprises an Ethernet port and the computer is coupled to the first network access node via the Ethernet port.

19. The apparatus of claim 11, wherein a total number of the one or more globally unique IP addresses is dynamically expandable over a virtual private network (VPN).

20. The apparatus of claim 11, wherein the one or more globally unique IP addresses form a pool of globally unique IP addresses, and the pool of globally unique IP addresses is shared by a plurality of hospitality establishments.

* * * * *